United States Patent
Ramachandran et al.

(10) Patent No.: US 10,452,984 B2
(45) Date of Patent: Oct. 22, 2019

(54) SYSTEM AND METHOD FOR AUTOMATED PATTERN BASED ALERT GENERATION

(71) Applicant: Pearson Education, Inc., New York, NY (US)

(72) Inventors: Lakshmi Ramachandran, Boulder, CO (US); Peter W. Foltz, Boulder, CO (US); Jian Cheng, Palo Alto, CA (US)

(73) Assignee: PEARSON EDUCATION, INC., New York, NY (US)

( * ) Notice: Subject to any disclaimer, the term of this patent is extended or adjusted under 35 U.S.C. 154(b) by 781 days.

(21) Appl. No.: 15/058,035

(22) Filed: Mar. 1, 2016

(65) Prior Publication Data

US 2017/0255867 A1    Sep. 7, 2017

(51) Int. Cl.
| | |
|---|---|
| G06N 5/04 | (2006.01) |
| G06N 20/00 | (2019.01) |
| G06F 16/951 | (2019.01) |
| G06F 16/23 | (2019.01) |
| G06F 16/2457 | (2019.01) |
| G06F 16/35 | (2019.01) |

(52) U.S. Cl.
CPC ......... G06N 5/047 (2013.01); G06F 16/2358 (2019.01); G06F 16/24575 (2019.01); G06F 16/353 (2019.01); G06F 16/951 (2019.01); G06N 20/00 (2019.01)

(58) Field of Classification Search
CPC ......... G06F 17/30368; G06F 17/30528; G06F 17/30864; G06F 17/30707; G06N 5/047; G06N 99/005; H04L 41/0681; H04L 41/069

USPC .......................................................... 706/12
See application file for complete search history.

(56) References Cited

U.S. PATENT DOCUMENTS

| | | | | |
|---|---|---|---|---|
| 8,132,242 | B1 * | 3/2012 | Wu ..................... | H04L 63/0884 713/168 |
| 8,386,386 | B1 * | 2/2013 | Zhu ..................... | G06Q 40/025 379/111 |
| 8,412,931 | B2 * | 4/2013 | Vedula ................ | H04L 63/1441 713/161 |
| 10,148,589 | B2 * | 12/2018 | Dronen ................ | G06F 9/4881 |
| 10,153,984 | B2 * | 12/2018 | Dronen, Jr. ........... | G06F 9/4881 |
| 2014/0056068 | A1 * | 2/2014 | Strasser .............. | G06F 11/1048 365/185.03 |
| 2017/0126718 | A1 * | 5/2017 | Baradaran ........... | H04L 63/1425 |

\* cited by examiner

*Primary Examiner* — Michael B Holmes
(74) *Attorney, Agent, or Firm* — Kilpatrick Townsend & Stockton LLP

(57) ABSTRACT

Systems and methods for alerting a third party device according to a result of automated evaluation of a received response packet according to at least one pattern in the data packet are disclosed herein. The system can include a memory having a pattern database and a model database. The system can further include a user device and a content management server. The content management server can receive a response packet and identify one or several patterns within the response packet. Based on the presence or absence of these one or several patterns in the response packet, the content management server can generate an evaluation of the response packet and generate and send an alert with the results of the evaluation.

20 Claims, 15 Drawing Sheets

SYSTEM AND METHOD FOR AUTOMATED PATTERN BASED ALERT GENERATION

BACKGROUND

This disclosure relates in general to machine learning and predictive modeling. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics; a discipline that also specializes in prediction-making. It has strong ties to mathematical optimization, which deliver methods, theory, and application domains to the field. Machine learning is employed in a range of computing tasks where designing and programming explicit, rule-based algorithms is infeasible. Example applications include spam filtering, optical character recognition (OCR), search engines and computer vision. Machine learning is sometimes conflated with data mining, although that focuses more on exploratory data analysis. Machine learning and pattern recognition can be viewed as two facets of the same field. When employed in industrial contexts, machine learning methods may be referred to as predictive analytics or predictive modelling.

BRIEF SUMMARY

One aspect of the present disclosure relates to a system for alerting a third party device according to a result of automated evaluation of a received response packet according to at least one pattern in the data packet. The system includes a memory including: a pattern database containing data defining at least two data patterns of tokens; and a model database including a model for generating an evaluative output for the received response packet. The system includes a user device including: a network interface that can exchange data with a content management server via a communication network; and an I/O subsystem that can convert electrical signals to user interpretable outputs user interface. The system can include the content management server that can: receive the response packet from the user device, which response packet includes a user generated text string forming a plurality of words; receive data from the pattern database, which data from the pattern database defines at least two data patterns of tokens; and automatically generate a binary value for each of the at least two data patterns of tokens, which binary value automatically generated for each of the at least two data patterns of tokens includes one of: a first binary value indicative of the presence of the data pattern in the response packet; and a second binary value indicative of the absence of the data pattern in the response packet. The content management server can: automatically generate an evaluation of the response packet based on the binary value generated for each of the at least two data patterns of tokens by applying the automatically generated binary values to the model; and generate and send an alert to a supervisor device when the evaluation is below a threshold value. The system can include a supervisor device including: a network interface that can exchange data with the content management server via the communication network; and an I/O subsystem that can convert electrical signals to user interpretable outputs user interface. In some embodiments, the supervisor device can receive the alert from the content management server and automatically provide alert data to the user via the I/O subsystem in response to receipt of the alert. In some embodiments, the alert data identifies at least one aspect of the response packet and the user of the user device.

In some embodiments, the content management server can train the model. In some embodiments, the memory further includes a training database, which training database includes a plurality of response packets associated with a data packet. In some embodiments, the training database further includes an evaluation matrix, which evaluation matrix identifies a plurality of performance levels and indicia associated with the performance levels. In some embodiments, the indicia identify one or more attributes of a response packet of one or more performance levels.

In some embodiments, training the model can include: receiving a training set from the training database, which training set includes some or all of the plurality of response packets associated with the data packet; retrieving score data for the response packets in the training set; dividing the training set into a plurality of performance groups; and identifying patterns in each of the performance groups. In some embodiments, each of the performance groups includes a subset of the training set, which training set is divided into performance groups according to the retrieved score data.

In some embodiments, identifying patterns in each of the performance groups includes: selecting a response packet; tokenizing the text string of the response packet, which text string is tokenized such that a token is associated with a word; and extracting pattern data from the tokenized text string. In some embodiments, the pattern data is stored in the pattern database. In some embodiments, the alert includes code to direct the supervisor device to provide an indicator of the received alert via the I/O subsystem. In some embodiments, the indicator of the received alert includes one: an aural indicator; a tactile indicator; and a visual indicator.

One aspect of the present disclosure relates to a method for alerting a third party device according to a result of automated evaluation of a received response packet according to at least one pattern in the data packet. The method includes: receiving a response packet at a content management server from a user device via a communications network, which response packet includes a user generated text string forming a plurality of words; receiving data from a pattern database, which data from the pattern database defines at least two data patterns of tokens; automatically generating a binary value for each of the at least two data patterns of tokens with the content management server, which binary value automatically generated for each of the at least two data patterns of tokens includes one of: a first binary value indicative of the presence of the data pattern in the response packet; and a second binary value indicative of the absence of the data pattern in the response packet; automatically generating an evaluation of the response packet based on the binary value generated for each of the at least two data patterns of tokens by applying the automatically generated binary values to a model for generating an evaluative output for the received response packet; and generating and sending an alert to a supervisor device when the evaluation triggers an alert status.

In some embodiments, the method can include training the model. In some embodiments, training the model includes: receiving a training set from the training database, which training set includes some or all of the plurality of response packets associated with the data packet; retrieving score data for the response packets in the training set; dividing the training set into a plurality of performance groups; and identifying patterns in each of the performance groups. In some embodiments, each of the performance groups includes a subset of the training set, which training set is divided into performance groups according to the retrieved score data.

In some embodiments, identifying patterns in each of the performance groups includes: selecting a response packet; tokenizing the text string of the response packet, which text string is tokenized such that a token is associated with a word; and extracting pattern data from the tokenized text string. In some embodiments the method further includes storing the pattern data in a pattern database. In some embodiments, the alert includes code to direct the supervisor device to provide an indicator of the received alert via the I/O subsystem. In some embodiments, the indicator of the received alert includes one: an aural indicator; a tactile indicator; and a visual indicator.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
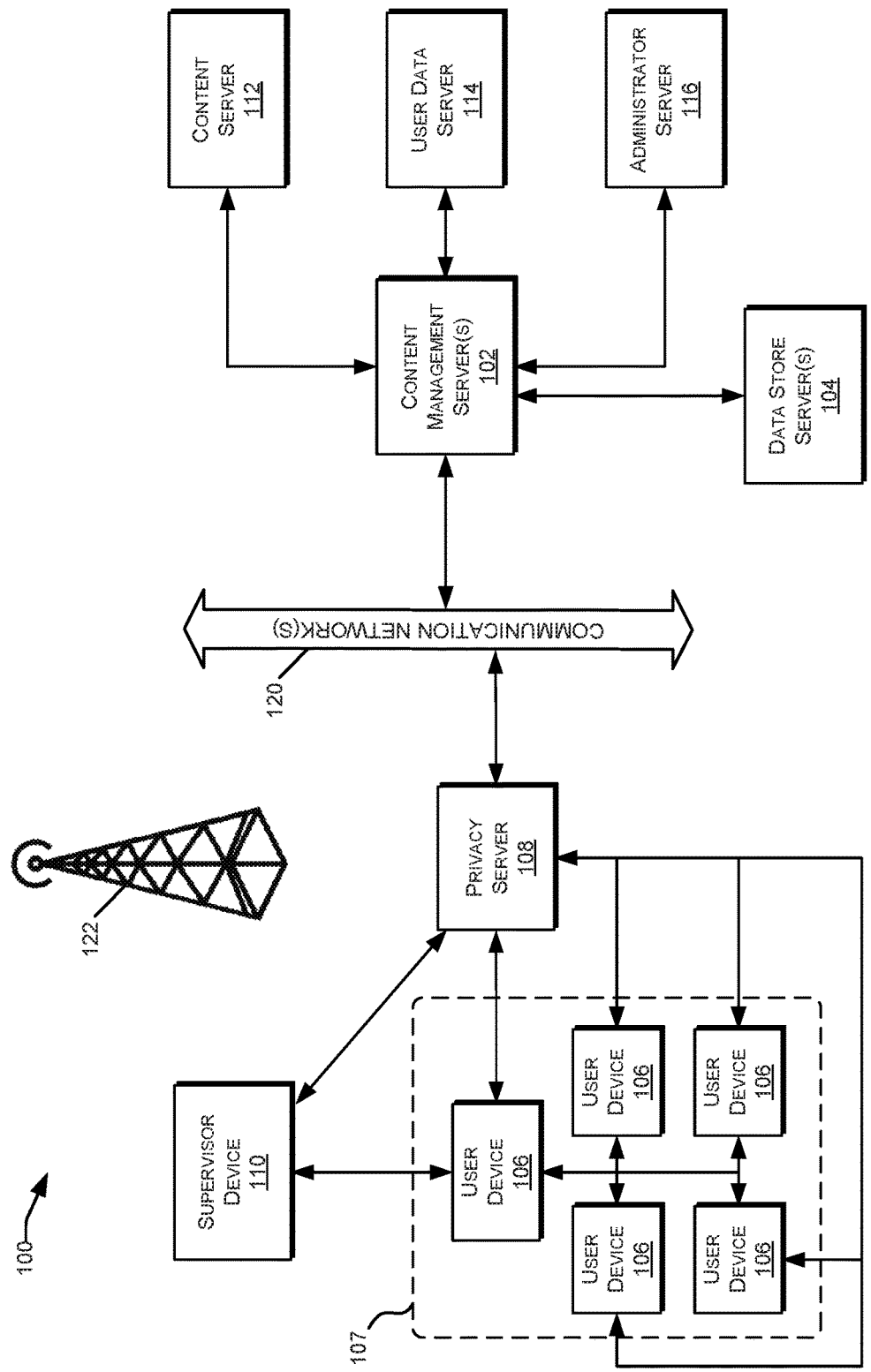
FIG. 1 is a block diagram illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
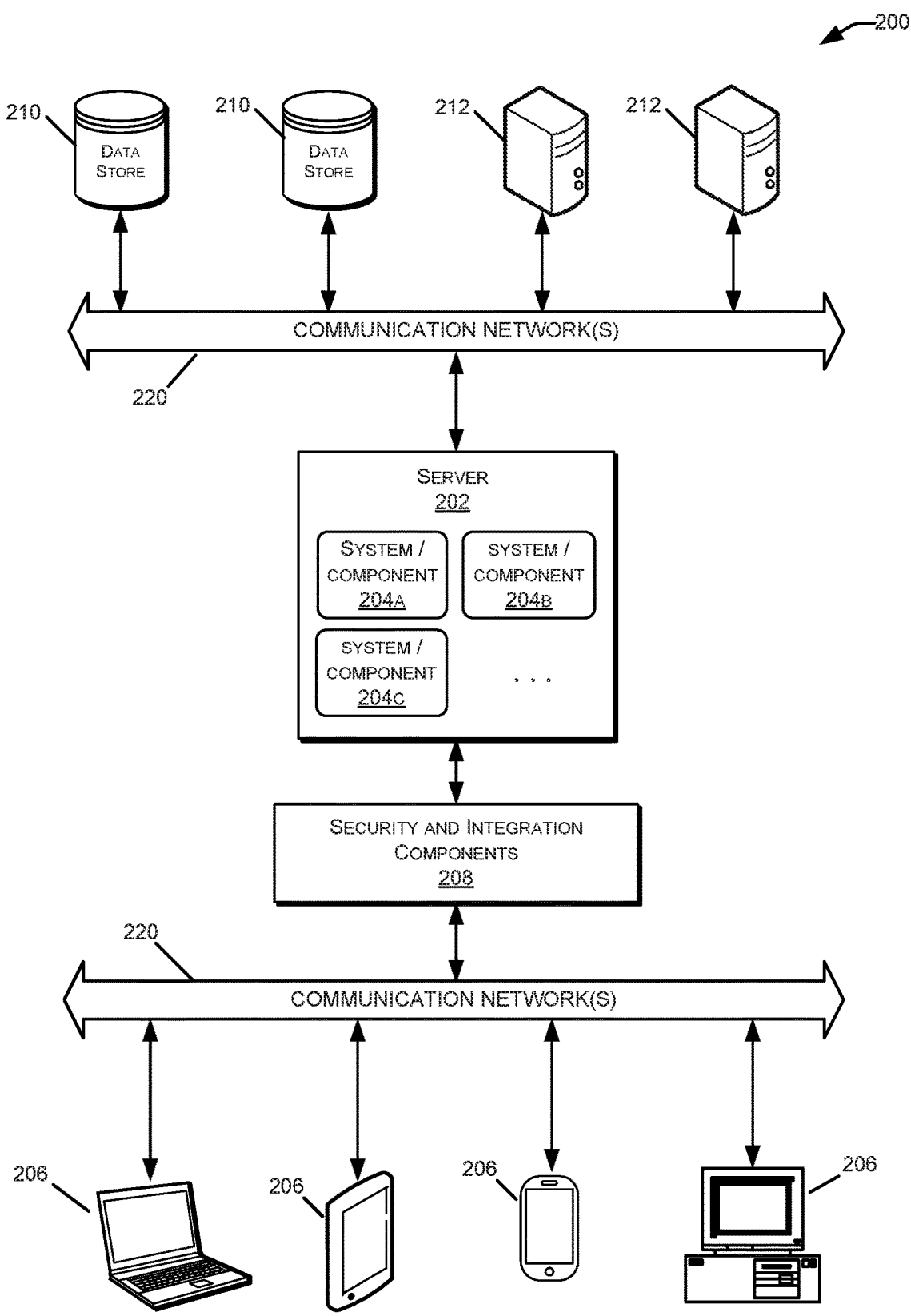
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
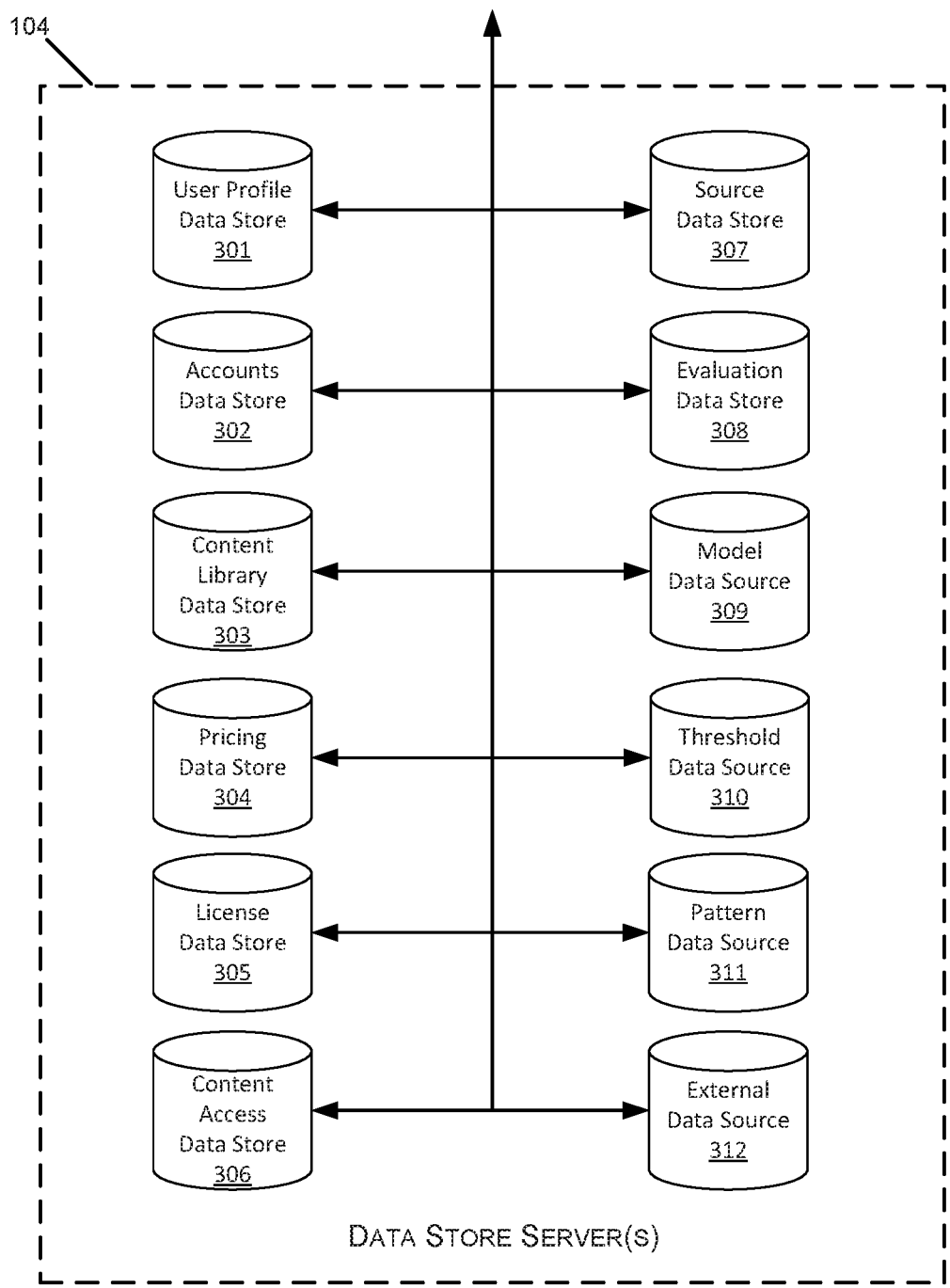
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-312 may be accessed by the content management server 102 and/or other devices and servers within the network 100 (e.g., user devices 106, supervisor devices 110, administrator servers 116, etc.). Access to one or more of the data stores 301-312 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100. In some embodiments, this information can include one or several response packets provided by students in response to one or several data packets. In some embodiments, for example, the students user profile may include a plurality of response packets provided by that student in response to one or several data packets. In some embodiments, these response packets can be associated with information relating to the data packet and/or relating to the response such as, for example, the amount of time used by the student in providing the response, the evaluation result in response, or the like.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics, also referred to herein as evaluation schedules or scoring guides, for use in the evaluation of the content, users, or applications. In some embodiments, the evaluation schedule can include a plurality of partitions each of which can correspond to a performance outcome. In some embodiments, each of the partitions can be associated with a text string identifying criteria of a response packet matching that partition and/or attributes of a response packet matching that partition. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model functions values. In some embodiments, these one or several model function values can be used to calculate a risk probability, which risk probability can characterize the risk of a user such as a student-user failing to achieve a desired outcome such as, for example, failing to achieve a desired level of completion of a program, for example in a predefined time period. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, the model database 309 can include one or several evaluation models. In some embodiments, these evaluation models can generate an evaluation of a response packet based on the presence or absence of one or several patterns in the response packet. In some embodiments, for example, these one or several patterns can be indicated as present or absent in the response packet by one or several Boolean values associated with the response packet. In some embodiments, these one or several evaluation models can be generated and/or trained as discussed below.

In some embodiments, the model database 309 can include one or several sets of data for use in generating and/or training a model. In some embodiments, these one or several sets of data for use in generating and/or training a model, also referred to herein as one or several training sets, can include, for example, a plurality of response packets received in response to one or several data packets. In some embodiments, these one or several response packets can be associated with the valuation information indicating the result of an evaluation already performed on the response packets by, for example, a human evaluator. In some embodiments, these one or several response packets forming the one or several training sets can be received from one or several user devices 106.

A threshold data source 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A pattern data source 311, also referred to herein as a pattern database, can store one or several patterns. In some embodiments, these one or several patterns can include patterns generated from, for example, one or several evaluation schedules and/or one or several response packets. In some embodiments, these patterns can include one or several word patterns which can identify, for example, the frequency of one or several words in one or several evaluation schedules and/or in one or several response packets. In some embodiments, these one or several patterns can include one or several semantic patterns which can identify one or several aspects of connectivity between one or several words in one or several evaluation schedules and/or one or several response packets. In some embodiments, a semantic pattern can, for example, include information identifying one or several words, the order of those one or several words, and the interrelation of those one or several words such as, for example, the role of those one or several words in a text string, such as a phrase, a sentence, a paragraph, or the like, in the one or several evaluation schedules and/or in the one or several response packets in which those words are included.

In some embodiments, the pattern database 311 can include information associated with one or several response packets, and specifically information identifying one or several patterns as present or absent in one or several response packets. In one embodiment, for example, the pattern database can include data associated with a response packet. This data can, via one or several values such as Boolean values, identify the presence or absence of one or several patterns in the associated response packet. In one embodiment, for example, this data can include a first Boolean value identifying a pattern associated with the Boolean value as present in the response packet, and/or a second Boolean value identifying a pattern associated with the Boolean value as absent in the response packet.

In addition to the illustrative data stores described above, data store server(s) 104 (e.g., database servers, file-based storage servers, etc.) may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party data stores containing demographic data, education related data, consumer sales data, health related data, and the like. Illustrative external data aggregators 312 may include, for example, social networking web servers, public records data stores, learning management systems, educational institution servers, business servers, consumer sales data stores, medical record data stores, etc. Data retrieved from various external data aggregators 312 may be used to verify and update user account information, suggest user content, and perform user and content evaluations.

Figure 4A:
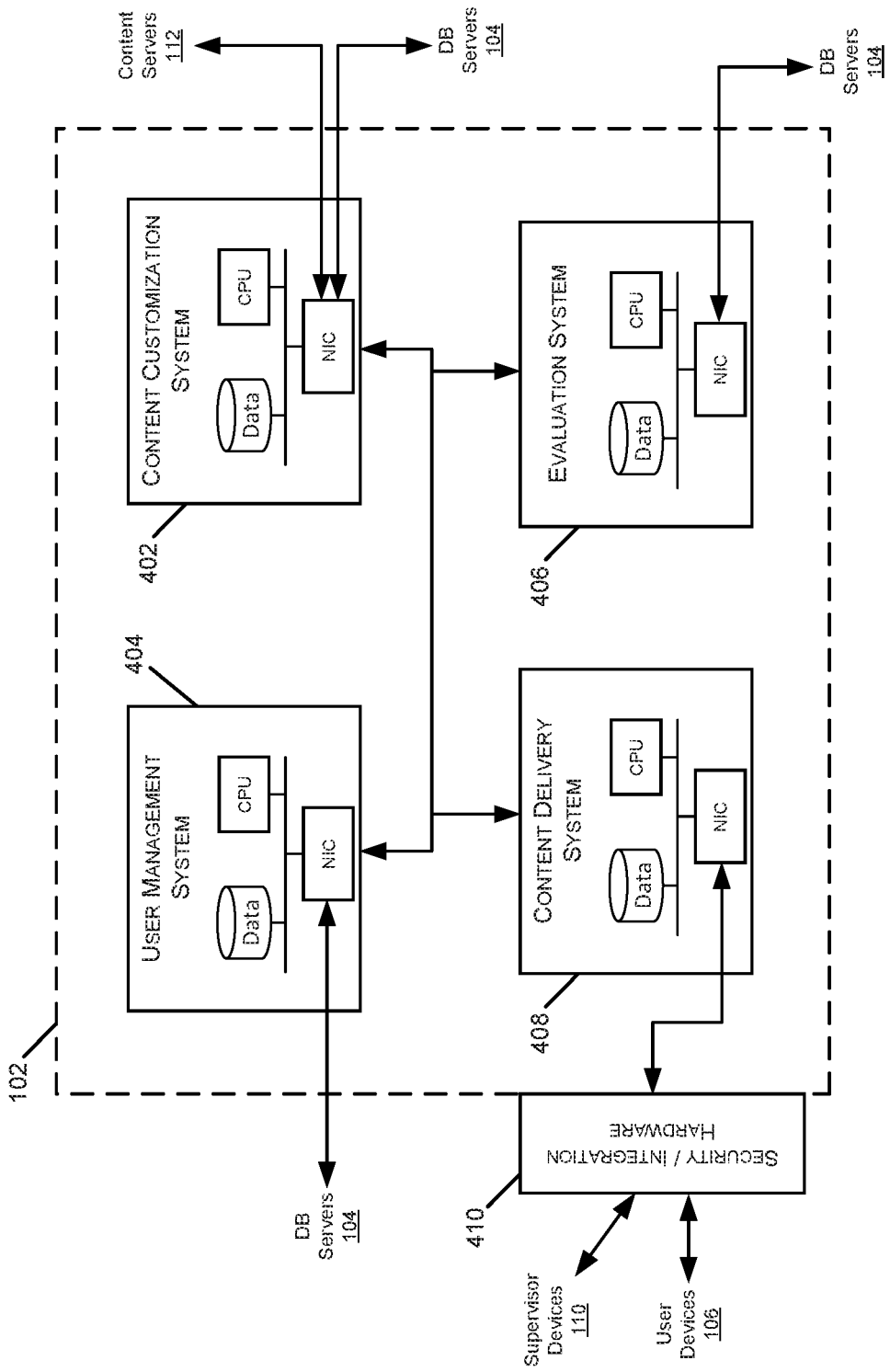
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 102 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several responses are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
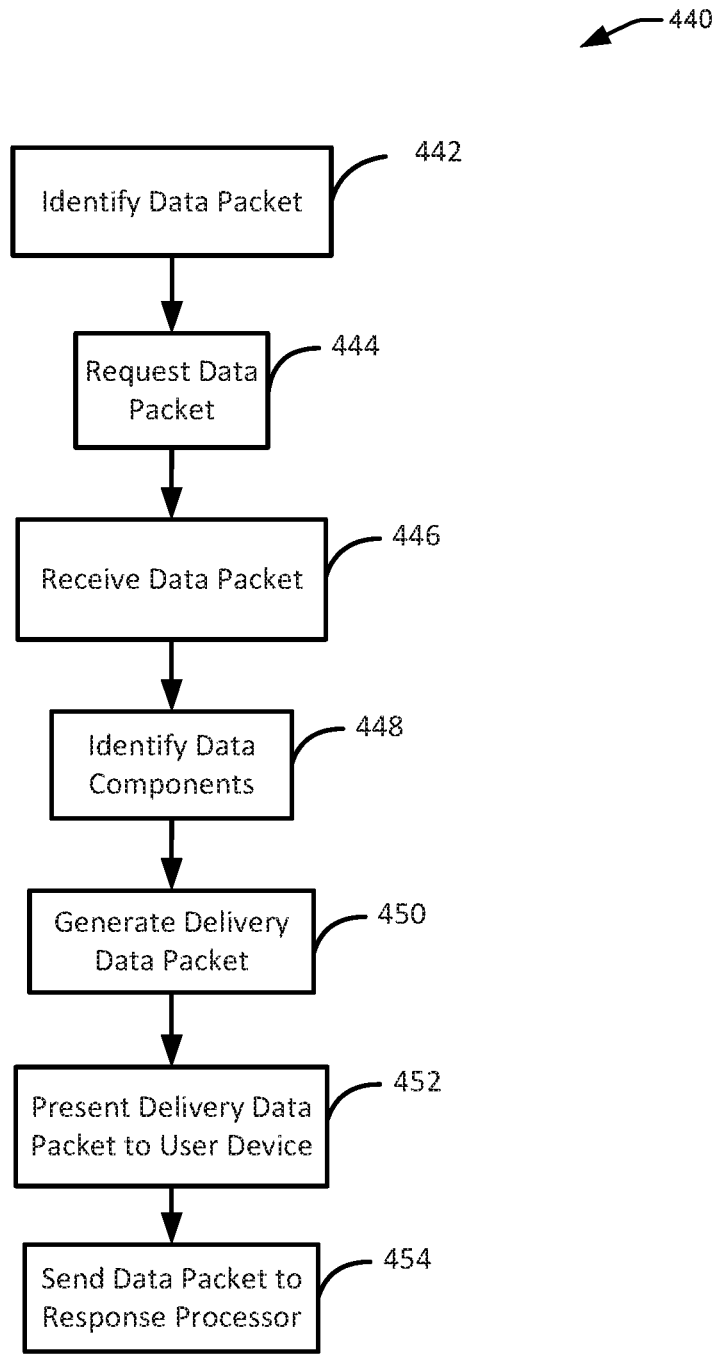
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user and to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
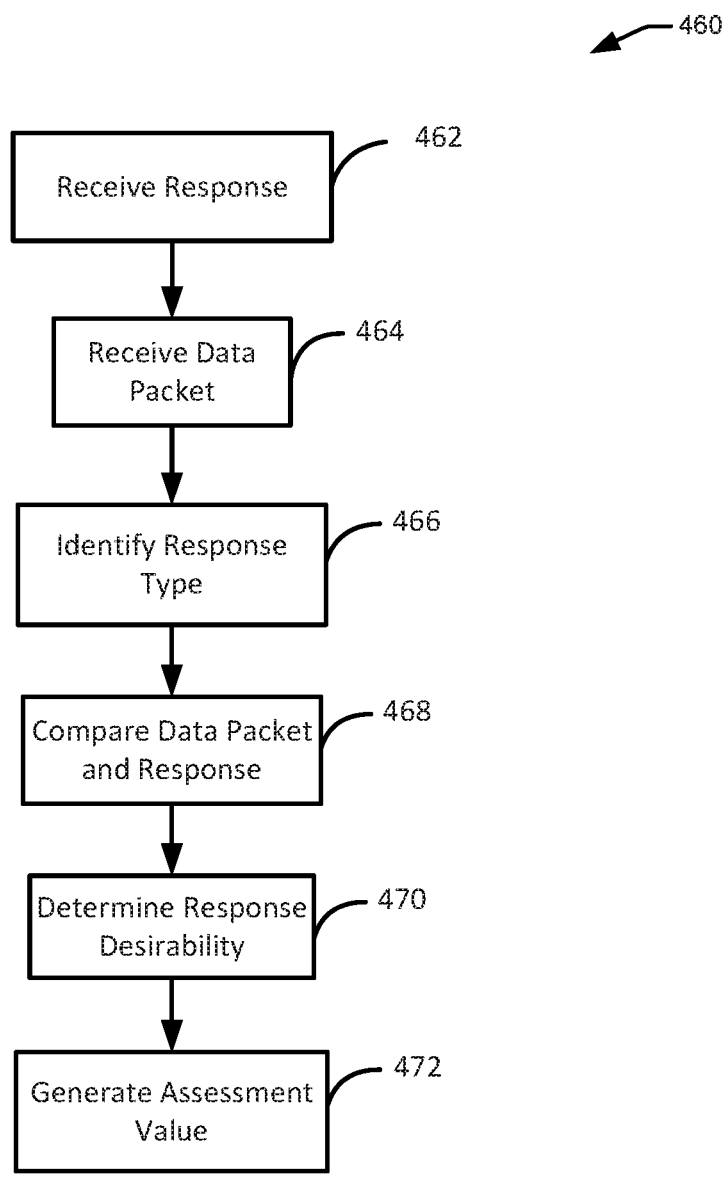
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response, also referred to herein as a response packet, is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more of a plurality of responses. This assessment value can be stored in one of the databases 104 such as the user profile database 301.

Figure 5:
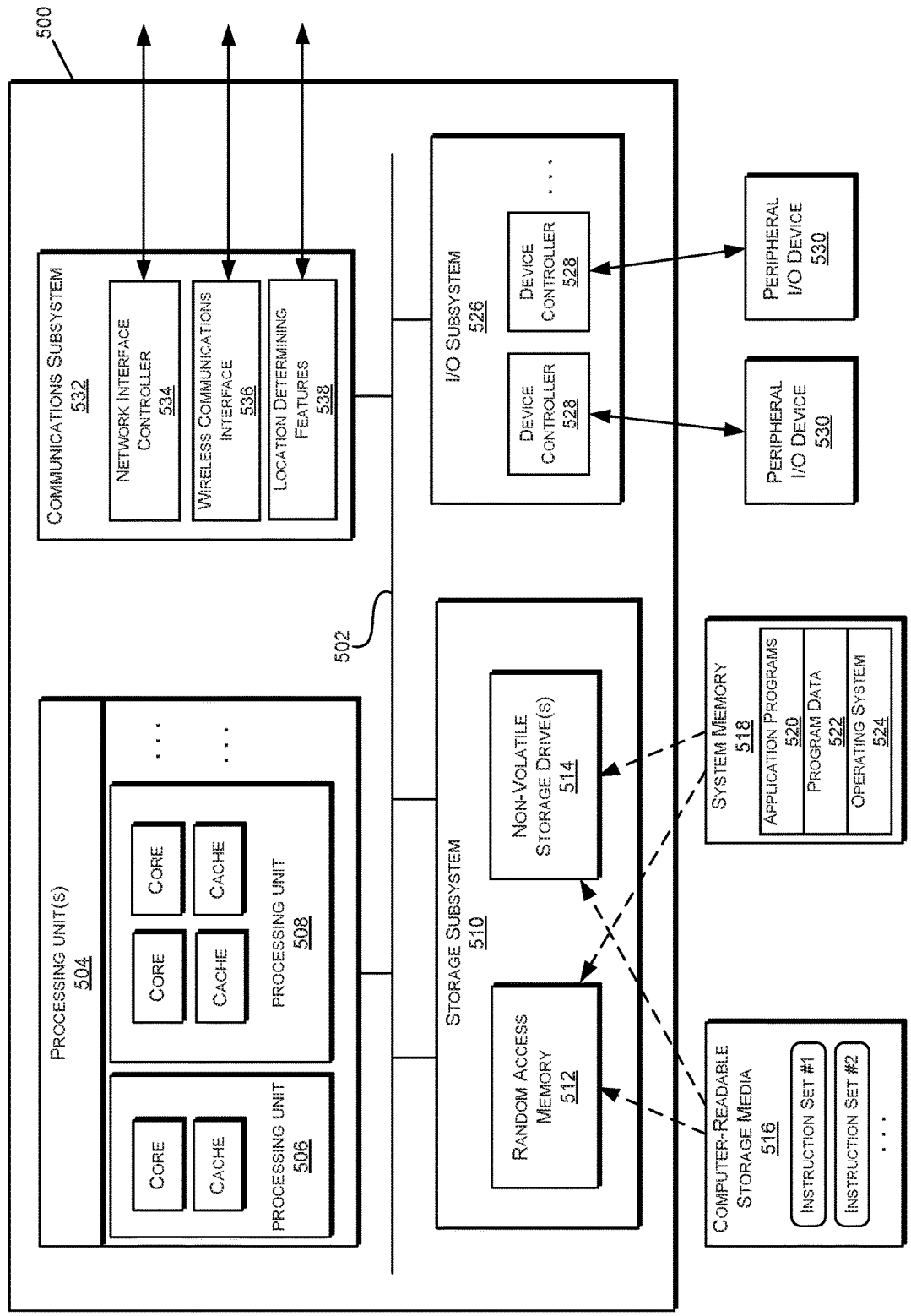
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple, concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
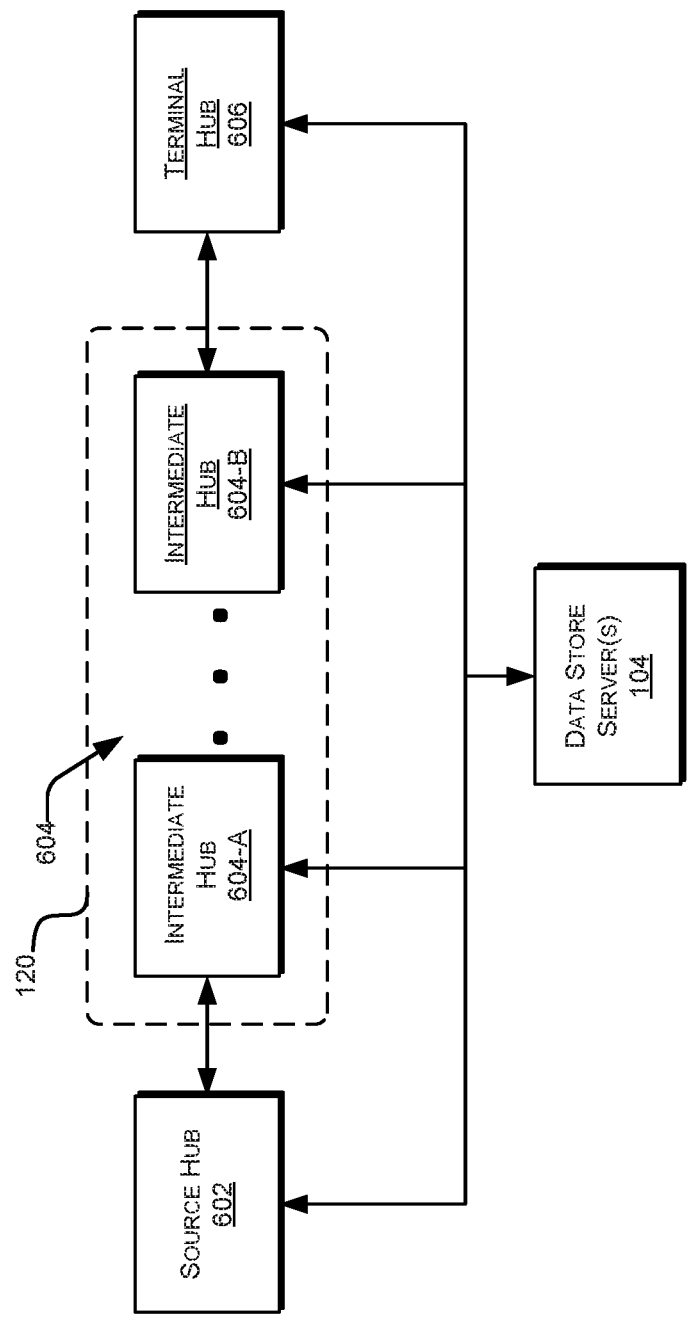
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
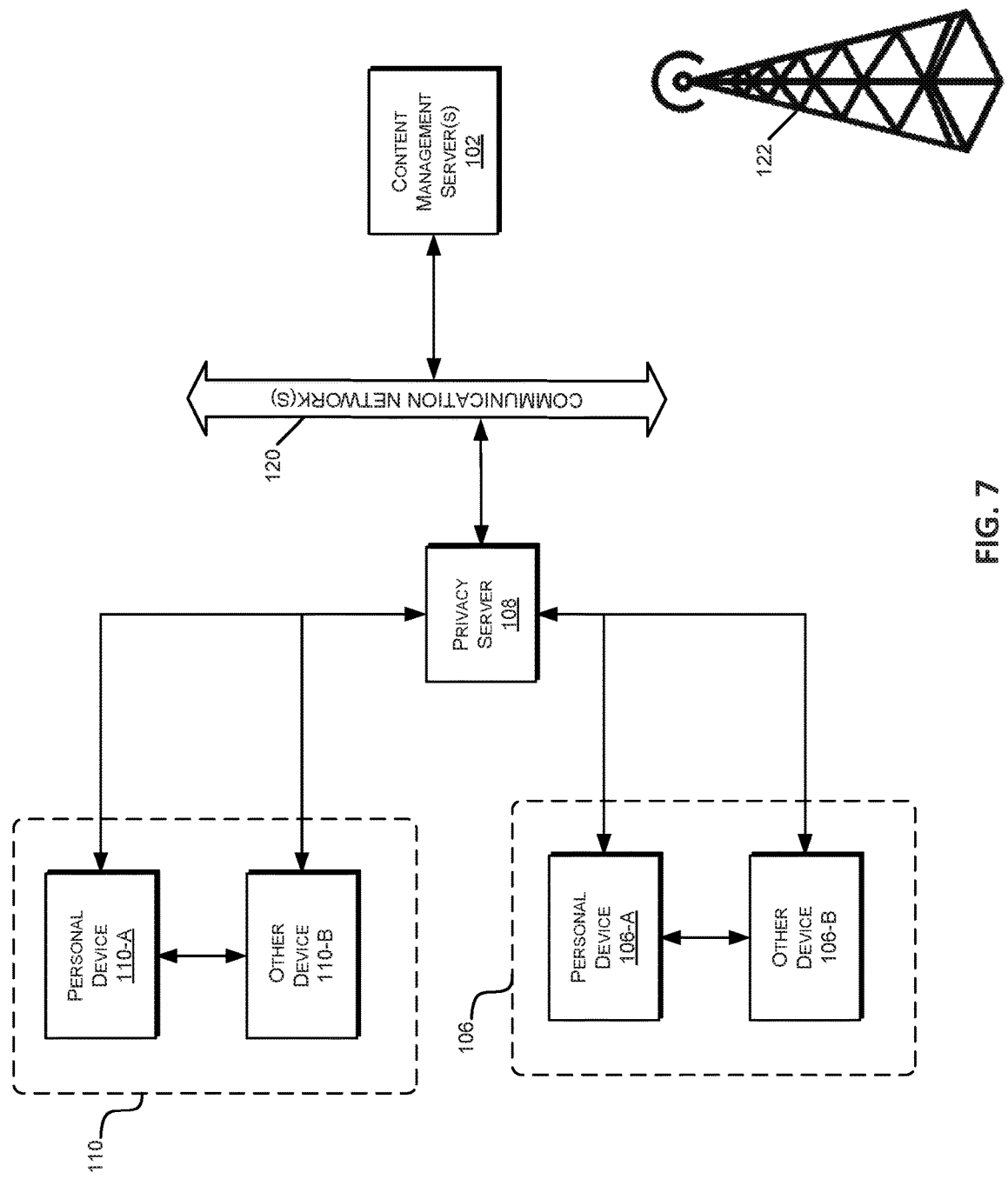
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using any other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
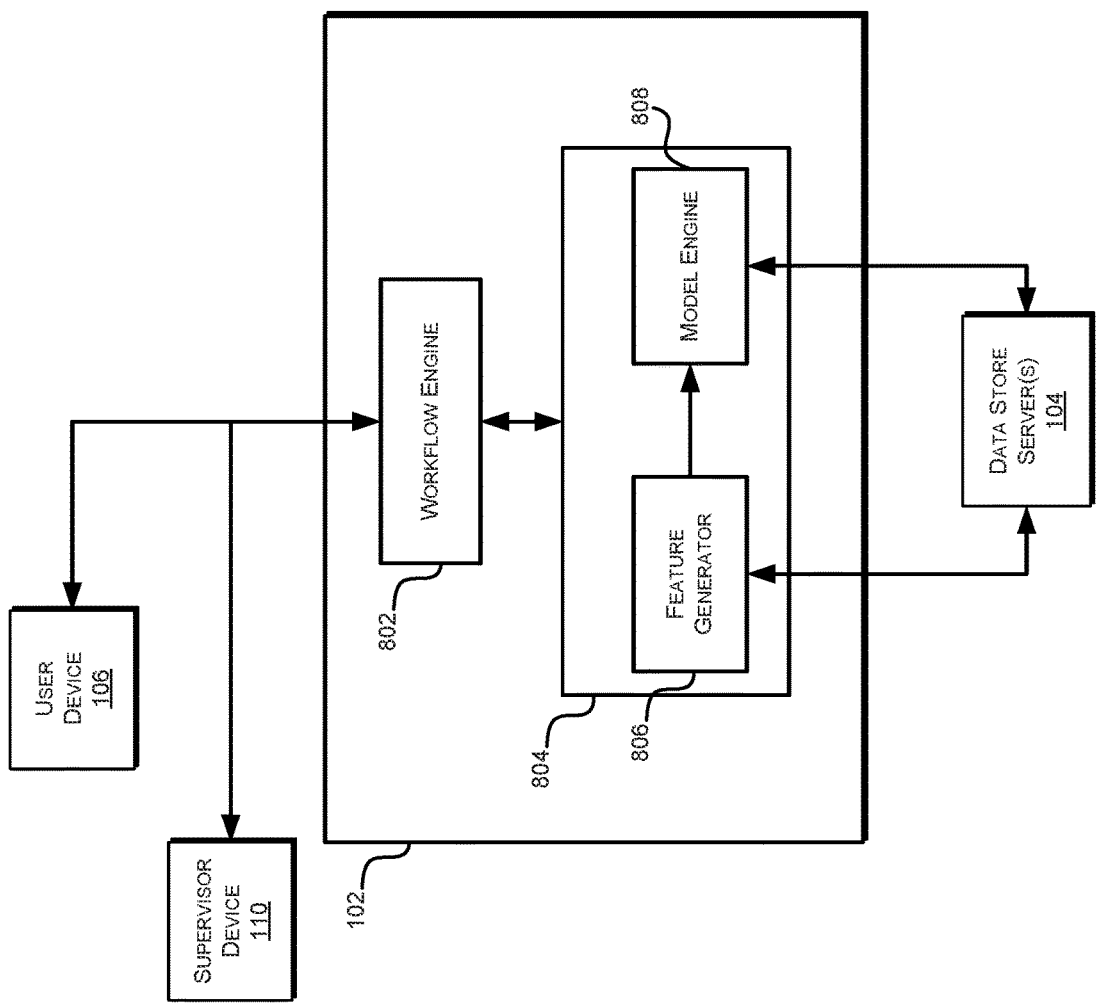
FIG. 8 is a schematic illustration of one embodiment of functional components of the content distribution network.

With reference now to FIG. 8, a schematic illustration of one embodiment of functional components of the content distribution network 100 is shown. As seen, in FIG. 8, this includes the server 102 which includes: a workflow engine 802; an evaluation engine 804 including a feature generator 806 and a model engine 808.

In some embodiments, the workflow engine 802 can comprise hardware or software within the server 102 that can direct and prioritize processing. In some embodiments, this can include receiving multiple processing requests and ordering the processing requests to maximize processing speed and/or efficiency. In some embodiments, for example, these processing requests can be organized according to priority, order of receipt, or the like.

The evaluation engine 804 can comprise hardware or software within the server 102 that can identify patterns within, for example, a response packet or an evaluation schedule, generate a model based on the patterns within the response packet or the evaluation schedule, and/or generate an evaluation of a response packet. Specifically, the evaluation engine 804 can include a feature generator 806 that can identify one or several patterns, also referred to herein as features, within, for example, one or several response packets and/or one or several evaluation schedules. In some embodiments, the feature generator can include software code that can parse text or text string(s) within the one or several response packets and/or evaluation schedules. In some embodiments, the feature generator 806 can tokenize all or portions of the text or text string(s) within the one or several response packets and/or evaluation schedules, identify relatedness between one or several words or phrases within the text or text string(s), and/or generate one or several word-order graphs, also referred to herein as word graphs from the one or several words or phrases within the text or text string(s). As used herein, "relatedness" relates to words or phrases having a similar meaning.

In some embodiments, the feature generator 806 can identify the presence or absence of one or several patterns within a response packet. In some embodiments, this can include the comparison of text or text string(s) within a response packet to one or several patterns. In some embodiments, if the feature generator 806 determines that the response packet includes a pattern, then a first Boolean value indicative of the presence of the therewith associated feature can be associated with the response packet, and a second Boolean value indicative of the absence of the therewith associated feature can be associated with the response packet if the pattern is absent from the response packet.

The model engine 808 can comprise hardware or software that creates a predictive model from information received from the feature generator and/or from one or more of the devices 106, 110. In some embodiments, this information can include, for example, one or several scores or evaluations associated with one or several response packets and/or features identified as present and/or absent in the one or several response packets.

With specific reference to FIG. 8, in some embodiments, a request for training of a model can be received by the server 102, and specifically by the workflow engine 802 from one of the devices 106, 110 such as the supervisor device 110 via the communications network 120. After this request has been received, a plurality of response packets forming a training set can be received and/or retrieved. In some embodiments, these one or several response packets can be received from a plurality of user devices 106, and in some embodiments, these one or several response packets can be received and/or retrieved from the data store servers 104, and specifically from, for example, the user profile database 301.

After the training set has been received, or while the training set is being received, the workflow engine 802 can prioritize and/or organize processing of the training of the model and can then, based on the prioritization and/or organization provide response packets to the evaluation engine 804, and specifically to the feature generator 806.

As discussed in greater detail herein, the feature generator can identify one or several patterns in some or all of the response packets. In one embodiment, for example, the feature generator 806 can identify one or several patterns in each of the response packets. These patterns can include, for example, word patterns which identify, for example, classes of words in a response packet and/or frequency of use of those classes of words in response packets, semantic patterns which can identify, for example groupings of words, including order of groupings of words and functional relationship between words in groupings of words, and/or frequencies of groupings of words in a response packet.

The feature generator 806 can further identify one or several patterns in an evaluation schedule which can be, for example, received and/or retrieved from the data server 104, and specifically from, for example, the evaluation data store 308. These patterns can include, for example, word patterns which identify, for example, classes of words in the evaluation schedule and/or in a partition of the evaluation schedule and/or frequency of use of those classes of words in the evaluation schedule and/or in a partition of the evaluation schedule, and semantic patterns which can identify, for example groupings of words, including order of groupings of words and a functional relationship between words in groupings of words, and/or frequencies of groupings of words in evaluation schedule and/or in a partition of the evaluation schedule.

The patterns identified by the feature generator 806 can be stored in the data stores server 104, and particularly in the pattern data source 311, and the patterns identified by the feature generator 806 can be provided to the model engine 808. The model engine 808 can generate and/or train a predictive model based on the patterns identified by the feature generator 806 and previously generated evaluation data associated with the response packets of the training set. The model generated and/or trained by the model engine can be stored in the data server 104, and specifically in the model data source 309.

In some embodiments, the content distribution network 100 can be used to evaluate one or several response packets. In such an embodiment, one or several response packets can be received by the server 102, and specifically by workflow engine 802 from, for example, a user device 106 and/or the supervisor device 110. In some embodiments, the server 102 can further receive a request for generation of an evaluation. The workflow engine 802 can provide one or several received response packets to the evaluation engine 804, and specifically to the feature generator 806.

The feature generator 806 can retrieve pattern information from the data server 104, and specifically from the pattern data source 311, which pattern information can identify one or several patterns identified in the training set, the evaluation schedule, and/or used to generate the model. The feature generator 806 can, for each of the received response packets, determine the presence or absence of patterns associated with the pattern information and can associate one or several Boolean values with each of the received response packets. In some embodiments, for example, these Boolean values can indicate the presence or absence of one or several of the patterns identified in the pattern data. Specifically, in some embodiments, for each pattern identified in the pattern data a Boolean value can be associated with the response packet to indicate the presence or absence of that pattern in the response packet. In such an embodiment, a first Boolean value can be associated with the response packet if the pattern identified in the pattern data is present in the response packet and the second Boolean value can be associated with the response packet if the pattern identified in the pattern data is absent from the response packet.

The Boolean values generated for a response packet can be provided to the model engine 808 and the model engine can see and/or retrieved the model from the data server 104, and specifically from the model data source 309. The model engine 808 can then, based on the Boolean values in the model, generating the evaluation for the response packet. This evaluation can be stored in the data server 104, and can specifically be stored in the user profile data store 301. In some embodiments, the generation of the evaluation can trigger the sending of an alert to one or several user devices 106 and/or one or several supervisor devices 110. In some embodiments, this alert can include information relating to the response packet and/or the evaluation of the response packet, and the receipt of the alert by the one or several user devices 106 and/or one or several supervisor devices 110 can result in the automatic presentation, in some embodiments in response to a user input at the recipient device, of this information to the user via the recipient device 106, 110 of the alert. In some embodiments, the generation of the evaluation can trigger the comparison of the evaluation result to one or several thresholds received from the threshold database 310. In some embodiments, this comparison can result in the triggering of the generation and sending an alert to one or several user devices 106 and/or one or several supervisor devices 110.

Figure 9:
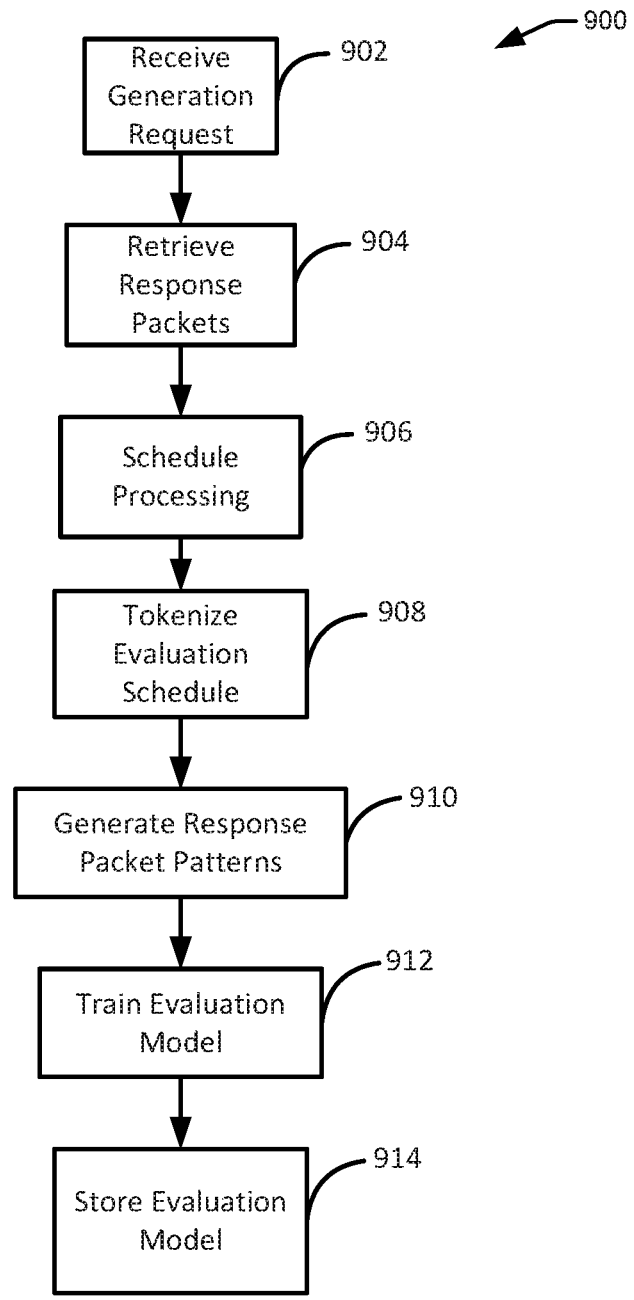
FIG. 9 is a flowchart illustrating one embodiment of a process for training a model.

With reference now to FIG. 9, a flowchart illustrating one embodiment of a process 900 for training a model is shown. The process 900 can be performed by the content distribution network 100, and specifically by some or all of the components of the content distribution network 100 shown in FIG. 8. The process begins at block 902 wherein a generation request is received at the server 102 from, for example, the supervisor device 110 via the communication network 120. In some embodiments, the generation request can request generation and/or training of the model for evaluating of response packets. After the generation request has been received, the process 900 proceeds to block 904 wherein one or several response packets are received and/or retrieved. In some embodiments, these response packets can form the training set and can be received from one or several user devices 106 and/or from the model data source 309.

After the response packets have been received and/or retrieved, the process 900 proceeds to block 906 wherein processing is scheduled. In some embodiments, scheduling of the processing can include determining a prioritization for the processing of the one or several response packets received and/or retrieved in block 904. In some embodiments, this prioritization can improve processor efficiency and/or increase processing speed by maximizing use of processing resources. This prioritization can be performed by the workflow engine 802.

After the processing has been scheduled, the process 900 proceeds to block 908 wherein an evaluation schedule is tokenized. In some embodiments, this can include identifying one or several partitions within the evaluation schedule, and tokenizing some or all of these one or several partitions. In some embodiments, the tokenization is the process of breaking a stream of text up into words, phrases, symbols, or other meaningful elements called tokens. Specifically, in some embodiments, the text and/or text string(s) in the evaluation schedule can be broken into words, phrases, symbols, or the like. In some embodiments, this tokenization can be performed using available tokenization software.

After the evaluation schedule has been tokenized, the process 900 proceeds to block 910, wherein response packet patterns are generated. In some embodiments, these response packet patterns are generated by the feature generator 806. In some embodiments, these response packet patterns can include one or several word patterns and/or one or several semantic patterns. In some embodiments, these response packet patterns, which can include on or several response packet patterns, can be stored in the data server 104, and specifically in the pattern database 311.

After the response packet patterns have been generated, the process 900 proceeds to block 912, wherein the evaluation model is trained. In some embodiments, the evaluation model can be trained by the model engine 808. In some embodiments, the training of the evaluation model can be performed according to any desired regression technique or machine learning technique. In some embodiments, these can include, for example, logistic regression, multinomial logistic regression, probit regression, one or several classification or regression trees such as, for example, Random forests, neural networks, Multilayer Perceptron, radial basis function, support vector machines, Naïve Bayes, or the like.

After the evaluation model has been trained, the process 900 proceeds to block 914, wherein the evaluation model is stored. In some embodiments, the evaluation model can be stored in the database server 104, and specifically in the model database 309.

Figure 10:
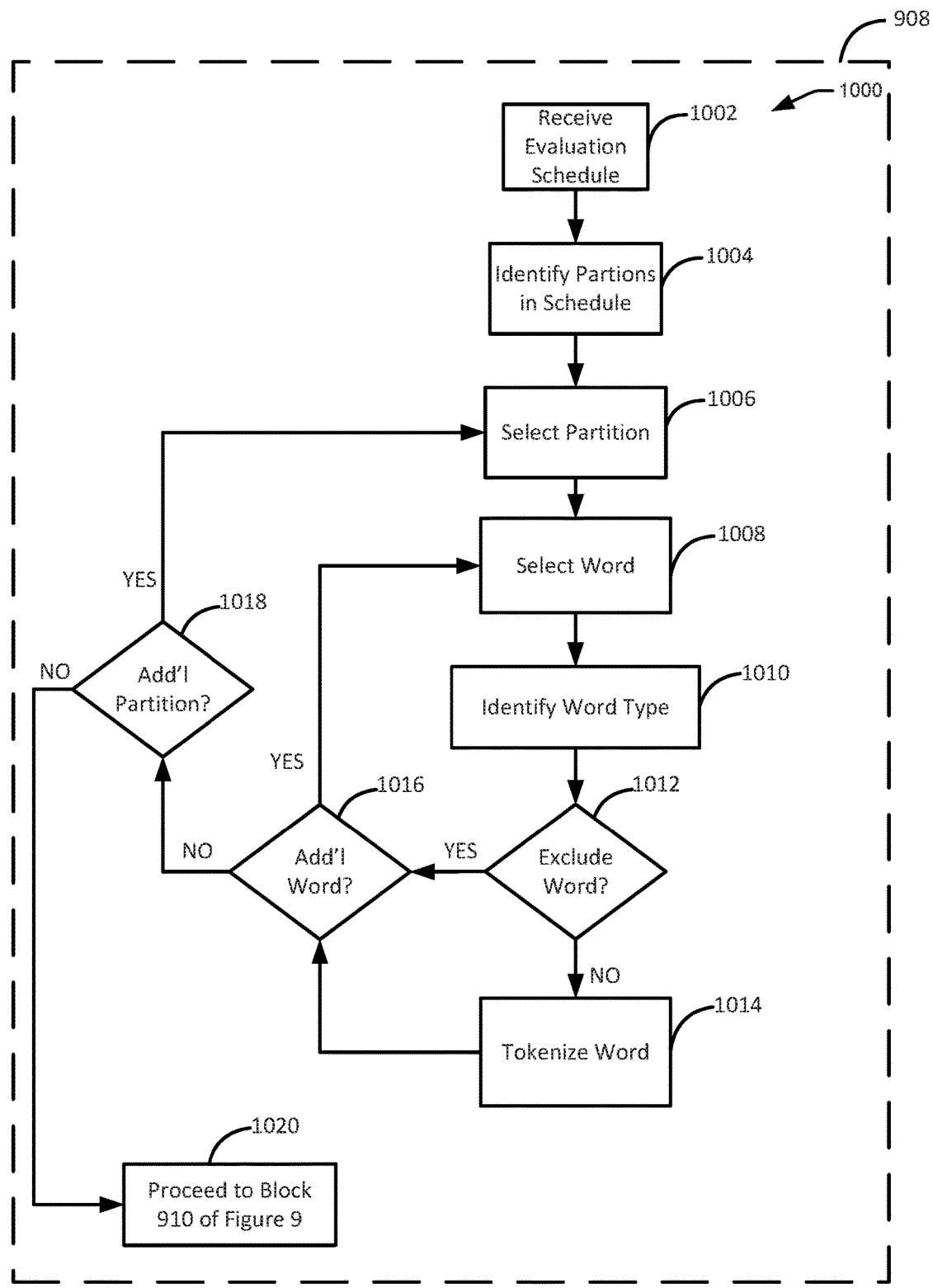
FIG. 10 is a flowchart illustrating one embodiment of a process for tokenizing an evaluation schedule.

With reference now to FIG. 10, a flowchart illustrating one embodiment of a process 1000 for tokenizing an evaluation schedule is shown. In some embodiments, the process can be performed in the place of, or as a part of step 908 of FIG. 9. The process 1000 can be performed by the content distribution network 100, and specifically by some or all of the components of the content distribution network 100 shown in FIG. 8.

The process begins at block 1002, wherein the evaluation schedule is received and/or retrieved. In some embodiments, the evaluation schedule can be received and/or retrieved from the database server 104, and specifically from the evaluation database 308. After the evaluation schedule has been received, the process 1000 proceeds to block 1004, wherein one or several partitions in the evaluation schedule are identified. In some embodiments, the evaluation schedule can include a plurality of partitions each of which can correspond to a performance outcome. In some embodiments, each of the partitions can be associated with a text string identifying criteria of a response packet matching that partition and/or attributes of a response packet matching that partition.

After the partitions in the schedule have been identified, the process 1000 proceeds to block 1006, wherein one of the partitions is selected. In some embodiments, the selected partition can correspond to the best performance outcome of previously unselected partitions, and in some embodiments, the selected partition can correspond to the worst performance outcome of previously unselected partitions. In some embodiments, the selected partition can be randomly selected from previously unselected partitions. In some embodiments, a value indicative of selection can be associated with the selected partition of the evaluation schedule and can be stored in the database server 104, and specifically can be stored in the evaluation database 308.

After the partition has been selected, the process 1000 proceeds to block 1008, wherein a word is selected. As used herein, a word can refer to a group of characters, including letter, numbers, punctuation, and/or symbols, that is included in a text string. In some embodiments, the group of characters can be bounded by, for example, one or several spaces, punctuation, returns, or the like. In some embodiments, a word as used herein can correspond to a word in a spoken language, and in some embodiments, a word as used herein does not correspond to a word in a spoken language.

In some embodiments, the selecting of a word can include the parsing of text and/or text string(s) in the evaluation schedule to identify one or several words. After the text and/or text string(s) have been parsed, one of the words identified by the parsing can be selected. Specifically, the words identified as parsed can be categorized as either selected or previously unselected, and one of the previously unselected words can be selected. In some embodiments, a value indicative of selection can be associated with the selected word such that the selected word is now included in the group of previously selected words.

After the word has been selected, the process 1000 proceeds to block 1010, wherein the word type of the selected word is identified. In some embodiments, this can include determining whether the selected word is a valuable word or a non-valuable word. As used herein, a non-valuable word is a frequently used on informative word such as, for example, one of the hundred most frequently used words in a language, one of the 500 most frequently used words in a language, one of the thousand most recently used words in the language, or the like. In some embodiments, the word type can be determined by identifying the word and comparing the word to a database of non-informative words. If the selected word is a non-informative or non-valuable word, that a first value can be associated with the selected word whereas if the selected word is an informative word, and a second value can be associated with the selected word.

After the word type is identified, the process 1000 proceeds to decision state 1012, wherein it is determined whether to exclude the word. In some embodiments, a word can be excluded when it is identified as a non-informative or non-valuable word. If it is determined that the word is a valuable word, and thus not to be excluded, the process 1000 proceeds to block 1014 wherein the word is tokenized. In some embodiments, the tokenization can be performed using available tokenization software.

After the tokenization of the word, or returning again to decision state 1012, if it is determined to exclude the work, then the process 1000 proceeds to decision state 1016 wherein it is determined whether there is an additional word. In some embodiments, this can include determining whether there are any available previously unselected words. If it is determined that there are previously unselected words, then the process 1000 returns to block 1008 in proceeds as outlined above.

Alternatively, if it is determined that there are no previously unselected words, the process 1000 proceeds to decision state 1018 wherein it is determined if there is an additional, previously unselected partition. In some embodiments, this can include determining whether a value indicative of selection is associated with all of the partitions in the received evaluation schedule, or whether some of the partitions the received evaluation schedule are associated with the value indicative of non-selection. If it is determined that there is an additional, previously unselected partition in the received evaluation schedule, than the process 1000 returns to block 1006 and proceeds as outlined above. Alternatively, if it is determined that there is no previously unselected partition, then the process continues to block 1020 and proceeds to block 910 of FIG. 9.

Figure 11:
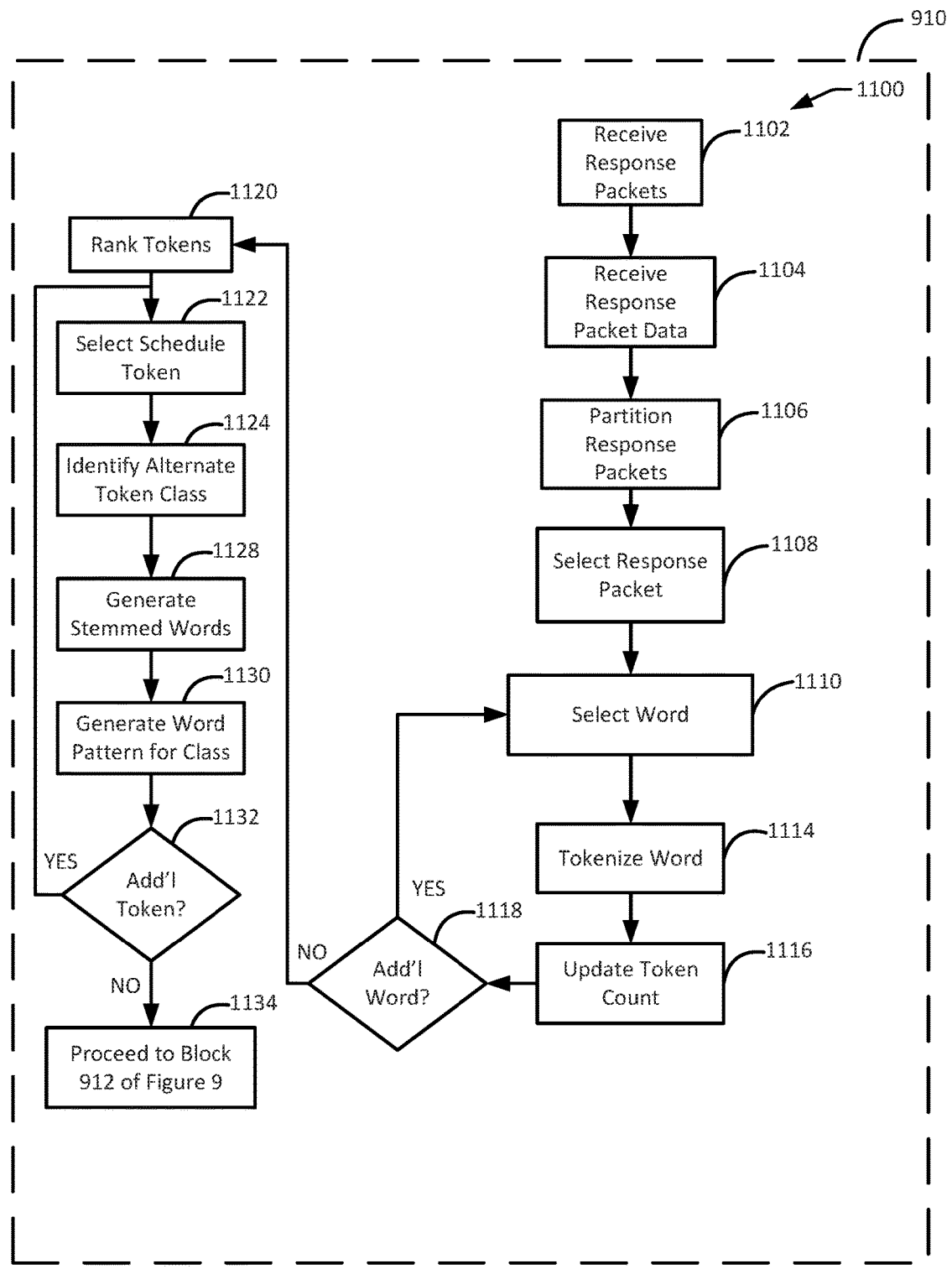
FIG. 11 is a flowchart illustrating one embodiment of a process for generating word patterns.

With reference now to FIG. 11, a flowchart illustrating one embodiment of a process 1100 for generating one or several word patterns is shown. In some embodiments, the process can be performed in the place of, or as a part of, step 910 of FIG. 9. The process 1100 can be performed by the content distribution network 100, and specifically by some or all of the components of the content distribution network 100 shown in FIG. 8.

The process 1100 begins at block 1102 wherein one or several response packets are received. In some embodiments, the one or several response packets can be received from one or several user devices 106, one or several supervisor devices 110, and/or from the database server 104 such as, for example, from the user profile database 301. In some embodiments, the response packets can be received by the server 102 via the communications network 120.

After the response packets have been received, the process 1100 proceeds to block 1104 wherein response packet data is received. In some embodiments, the response packet data can include identification of the result of a previously performed valuation for some or all of the response packets received in block 1102. In some embodiments, the response packet data can be received from the database server 104, and specifically from the user profile database 301 and/or evaluation database 308.

After the response packet data has been received, the process 1100 proceeds to block 1106 wherein the response packets are partitioned. In some embodiments, the response packets can be partitioned according to the partitions identified in the evaluation schedule in block 1004 of FIG. 10. In such an embodiment, response packet data including evaluation results can be used to sort response packets into the corresponding partition of the evaluation schedule. Thus, in one embodiment, a response packet would be identified as belonging to the partition associated with the evaluation result matching the actual evaluation result of that response packet. In some embodiments, this partition of the response packets can be performed by the server 102.

After the response packets have been partitioned, the process 1100 proceeds to block 1108 wherein a response packet is selected. In some embodiments, the selection response packet can further include the selection of one of the partitions and then a selection of one response packet in that selected one of the partitions. In some embodiments, the selected partition can correspond to the best performance outcome of previously unselected partitions, and in some embodiments, the selected partition can correspond to the worst performance outcome of previously unselected partitions. In some embodiments, the selected partition can be randomly selected from previously unselected partitions. In some embodiments, a value indicative of selection can be associated with the selected partition of the evaluation schedule and can be stored in the database server 104, and specifically can be stored in the evaluation database 308.

In some embodiments, one of the response packets can be selected from the set of response packets in the selected partition. In some embodiments, the selection can be randomly performed from the group response packets that have not been previously selected, and in some embodiments, the selection can be non-randomly performed from the group of response packets that have not been previously selected. In some embodiments, a value indicative of selection can be associated with the selected response packet.

After the response packet has been selected, the process 1100 proceeds to block 1110 wherein a word is selected. In some embodiments, the selecting of a word can include the parsing of text and/or text string(s) in the selected response packet to identify one or several words. After the text and/or text string(s) have been parsed, one of the words identified by the parsing can be selected. Specifically, the words identified as parsed can be categorized as either selected or previously unselected, and one of the previously unselected words can be selected. In some embodiments, a value indicative of selection can be associated with the selected word such that the selected word is now included in the group of previously selected words.

After the word has been selected, the process 1100 proceeds to block 1114 wherein the selected word is tokenized. In some embodiments, the selected word can be tokenized using available tokenization software. After the selected word has been tokenized, the process 1100 proceeds to block 1116 wherein a token count is updated. In some embodiments, for example, the token count can comprise a count identifying the number of times a tokenized word appears in the evaluation schedule, the selected response, the selected partition of the selected response, or the like. In some embodiments, the token count comprises a plurality of counts associated with a token such that a first count tracks the number of occurrences of the word associated with the plurality of counts in the evaluation schedule, a second count tracks the number of occurrences of the word associated with the plurality of counts in the selected response packet, and a third count tracks the number of occurrences of the word associated with the plurality of counts in the selected partition in the selected response packet.

After the token counts have been updated, the process 1100 proceeds to decision state 1118, wherein it is determined if there is an additional word in the selected partition and/or the selected response packet. If there is an additional word in the selected partition and/or the selected response packet, then the process 1100 returns to block 1110 and proceeds as outlined above. Similarly, in some embodiment, if there are additional unselected partitions including unselected response packets, then the process 1100 returns to block 1110, selects a new partition, and proceeds as outlined above.

If it is determined that there is no additional word, than the process 1100 proceeds to block 1120 wherein the tokens are ranked according to their token counts. In some embodiments, the tokens are ranked according to their token count for some or all of the token count for the evaluation schedule, the token count for the response packet, and/or the token count for the partition of the response packet. In some embodiments, the tokens can be ranked from the token having the largest token count to the token having the smallest token. The tokens can be ranked by the server 102.

After the tokens have been ranked, the process 1100 proceeds to block 1122 wherein a schedule token is selected. In some embodiments, schedule token is a token occurring in the evaluation schedule. In some embodiments, the selected schedule token can be to schedule tokens having the highest rank of available schedule tokens, and specifically can be the schedule token having the largest token count of available schedule tokens. In some embodiments, a value indicative of selection of a schedule token is associated with a schedule token at the time of selection so as to allow differentiation between previously selected schedule tokens and unselected schedule tokens.

After the schedule token has been selected, the process 1100 proceeds to block 1124 wherein one or several alternative token classes are identified. In some embodiments, one or several alternative token classes can include one or several tokens corresponding to one or several words having a similar meaning to the word associated with the schedule token selected in block 1122. In some embodiments, this can be performed by identifying a set of words linked to the word corresponding to the token selected in block 1122 via, for example, a lexical ontology or a lexical database. In some embodiments, the alternative token classes can include the tokens of words linked via the lexical ontology where the lexical database to the word corresponding to the token selected in block 1122.

After the alternative token class has been identified, the process 1100 proceeds to block 1128 wherein stemmed words are generated. In some embodiments, a stemmed word can comprise the junior sized version of a word identified in the evaluation schedule or in one or several of the response packets. In one embodiment, for example, a word can be stemmed by removing any generic suffixes from the word. By way of example, the stemmed version of the word "container" can be, in some embodiments, the word "contain." In some embodiments, the generation of the stemmed words can include the storing of the stemmed words in the database server 104, and specifically in the pattern database 311. In some embodiments, this can further include the storing of any removed suffixes as "alternative forms" of the stemmed word.

After the selected word has been stemmed, the process 1100 proceeds to block 1130 wherein a word pattern is generated for the identified alternate token class. In some embodiments, the word pattern can be generated by linking some or all of the tokens in the alternate token class with an "OR" operator, and in some embodiments, some or all of a plurality of alternate token classes can be linked by an "AND" operator. In some embodiments, the word pattern can be stored in the database server 104, and specifically in the pattern database 311.

After the word pattern for the alternate token class or classes has been generated, the process 1100 proceeds to decision state 1132 wherein it is determined if there is an additional schedule token, and specifically wherein it is determined if there is an additional unselected schedule token. In some embodiments, this is determined based on values associated with schedule tokens selected in block 1122. If it is determined that there is an additional schedule token, then the process 1100 returns to block 1122 and proceeds as outlined above. If it is determined that there is not an additional unselected schedule token, then the process 1100 continues to block 1134, and proceeds to block 912 of FIG. 9.

Figure 12:
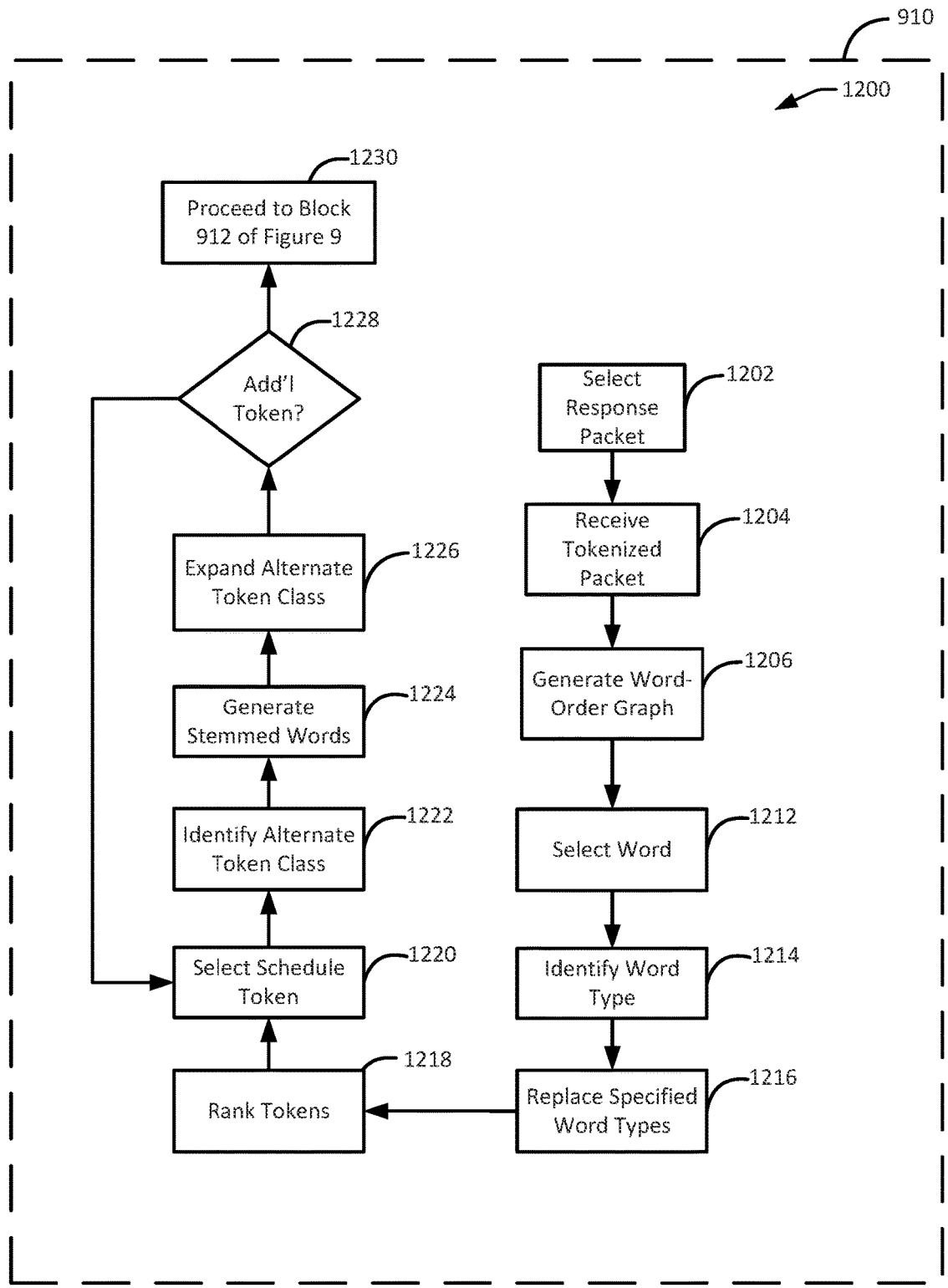
FIG. 12 is a flowchart illustrating one embodiment of a process for generating semantic patterns.

With reference now to FIG. 12, a flowchart illustrating one embodiment of a process 1200 for generating a semantic pattern is shown. In some embodiments, the process 1200 can be performed in the place of, or as a part of step 910 of FIG. 9 including, for example, in addition to the process 1100 of FIG. 11. The process 1200 can be performed by the content distribution network 100, and specifically by some or all of the components of the content distribution network 100 shown in FIG. 8.

In some embodiments, the process 1200 can include steps 1102 to 1106 of process 1100 of FIG. 11, and can then proceed to block 1202, wherein a response packet is selected. In some embodiments, the selection response packet can further include the selection of one of the partitions and then a selection of one response packet in that selected one of the partitions. In some embodiments, the selected partition can correspond to the best performance outcome of previously unselected partitions, and in some embodiments, the selected partition can correspond to the worst performance outcome of previously unselected partitions. In some embodiments, the selected partition can be randomly selected from previously unselected partitions. In some embodiments, a value indicative of selection can be associated with the selected partition of the evaluation schedule and can be stored in the database server 104, and specifically can be stored in the evaluation database 308.

After the response packet has been selected, the process 1200 proceeds to block 1204, wherein the tokenized packet is received. In some embodiments, the tokenized packet is the output of steps 1110 through 1118 of FIG. 11 after all of the words, or all of the desired words in the response packet have been tokenized. In some embodiments, the output of steps 1110 through 1118 of FIG. 11 can be stored in the database server 104, and specifically in the pattern database 311. In some embodiments, the tokenized packet can be received and/or retrieved at block 1204 from the database server 104, and specifically from the pattern database 311.

After the tokenized packet has been received, the process 1200 proceeds to block 1206, wherein a word order graph is generated. In some embodiments, a word order graph can comprise a plurality of nodes, also referred to herein as a plurality of vertices, representing words in a tokenized packets, and edges connecting the nodes. In some embodiments, the connection of the nodes by the edges corresponds to the order in which the words occur in the tokenized packets and/or the interrelation between the words in the tokenized packets. In some embodiments, the generation of a word order graph can include the generation of one or several nodes corresponding to the one or several words in the response packet and/or the generation of one or several edges linking the one or several nodes.

In some embodiments, the generation of the word order graph can include the identification and/or tagging of a part-of-speech for some or all of the words in the response packet. In some embodiments, these parts-of-speech can include, for example, one or several nouns, verbs, adjectives, adverbs, or the like. In some embodiments, this can be performed by available part-of-speech tagging software.

After the part-of-speech has been tagged, the generation of the word order graph can include the generation of one or several nodes. In some embodiments, each of these one or several nodes corresponds to a word or group of words in the response packet. In some embodiments, these groups of words can be formed according to rules relating to the identified part-of-speech of the words in one of these groups of words. In one embodiment, for example, adjacent words that are each tagged as "verbs" can be grouped together into a single node. By way of further example, in some embodiments, each consecutive noun component in the response packet, which noun components can include one or several: nouns, prepositions, conjunctions, and/or wh-pronouns can be combined to form a single noun node.

In some embodiments, after the nodes have been created, the generation of a word order graph can include the generation of one or several edges linking the one or several created nodes. In one embodiment, for example, these edges can be created based on any one or several rules such as, for example, the order of the words. In one embodiment, for example, an edge can be created between a verb vertex and the most proximate noun vertex and creates a noun-verb edge between these identified nodes. In some embodiments, the word order graph, and specifically the nodes and vertices of the word order graph can be stored in the database server 104, and specifically in the pattern database 311.

After the word order graph has been generated, the process 1200 proceeds to block 1212, wherein a word is selected. In some embodiments, the selecting of a word can include the parsing of text and/or text string(s) in the evaluation schedule to identify one or several words. After the text and/or text string(s) have been parsed, one of the words identified by the parsing can be selected. Specifically, the words identified as parsed can be categorized as either selected or previously unselected, and one of the previously unselected words can be selected. In some embodiments, a value indicative of selection can be associated with the selected word such that the selected word is now included in the group of previously selected words.

After the word is been selected, the process 1200 proceeds to block 1214, wherein the word type of the selected word is identified. In some embodiments, this can include determining whether the selected word is a valuable word or a non-valuable word. As used herein, a non-valuable word is a frequently used word or non-informative word such as, for example, one of the hundred most frequently used words in a language, one of the 500 most frequently used words in a language, one of the thousand most recently used words in the language, or the like. In some embodiments, the word type can be determined by identifying the word and comparing the word to a database of non-informative words. If the selected word is a non-informative or non-valuable word, then a first value can be associated with the selected word whereas if the selected word is an informative word, and a second value can be associated with the selected word.

After the word type has been identified, the process 1200 proceeds to block 1216, wherein words of one or several pre-specified types are replaced. In some embodiments, these specified word types are replaced in the word order graph. In some embodiments, these words of one or several pre-specified types can be replaced via removal from the word order graphs and/or can be replaced via the inclusion of one or several place-holders in their place. In some embodiments, these place holder can specify, for example, the number of words they are replacing and/or the length of the words they are replacing. In some embodiments, the word order graphs can be updated to include these replaced words, and specifically, the word order graphs stored in the database server 104 and/or in the pattern database 311 can be updated.

After the specified word types have been replaced, the process 1200 proceeds to block 1218, wherein the tokens are ranked according to their token counts. In some embodiments, the tokens are ranked according to their token count for some or all of the token count for the evaluation schedule, the token count for the response packet, and/or the token count for the partition of the response packet. In some embodiments, the tokens can be ranked from the token having the largest token count to the token having the smallest token. The tokens can be ranked by the server 102.

After the tokens have been ranked, the process 1200 proceeds to block 1220 wherein a schedule token is selected. In some embodiments, schedule token is a token occurring in the evaluation schedule. In some embodiments, the selected schedule token can be to schedule the token having the highest rank of available schedule tokens, and specifically can be the schedule token having the largest token count of available schedule tokens. In some embodiments, a value indicative of selection of a schedule token is associated with a schedule token at the time of selection so as to allow differentiation between previously selected schedule tokens and unselected schedule tokens.

After the schedule token has been selected, the process 1200 proceeds to block 1222 wherein one or several alternative token classes are identified. In some embodiments, one or several alternative token classes can include one or several tokens corresponding to one or several words having a similar meaning to the word associated with the schedule token selected in block 1220. In some embodiments, this can be performed by identifying a set of words linked to the word corresponding to the token selected in block 1220 via, for example, a lexical ontology or a lexical database. In some embodiments, the alternative token classes can include the tokens of words linked via the lexical ontology where the lexical database to the word corresponding to the token selected in block 1220.

After the alternative token class has been identified, the process 1200 proceeds to block 1224 wherein stemmed words are generated. In some embodiments, a stemmed word can comprise the junior sized version of a word identified in the evaluation schedule or in one or several of the response packets. In one embodiment, for example, a word can be stemmed by removing any generic suffixes from the word. By way of example, the stemmed version of the word "container" can be, in some embodiments, the word "contain." In some embodiments, the generation of the stemmed words can include the storing of the stemmed words in the database server 104, and specifically in the pattern database 311. In some embodiments, this can further include the storing of any removed suffixes as "alternative forms" of the stemmed word.

After the stemmed words have been generated, the process 1200 proceeds to block 1226, wherein the alternate token class identified in block 122 is expanded. In some embodiments, the alternate token class can be expanded by identifying, for example, one or several synonyms corresponding to the tokenized words in the alternate class, and linking these synonyms to the other words in the alternate token class via an "OR" operator, and in some embodiments one or several of a plurality of alternate token classes can be linked by an "AND" operator. In some embodiments, a plurality of lined alternate token classes can form a word pattern. In some embodiments, the expanded alternate token class can be stored in the database server 104, and specifically in the pattern database 311.

After the alternate token class has been expanded, the process 1200 proceeds to decision state 1228, wherein it is determined if there is an additional schedule token, and specifically wherein it is determined if there is an additional unselected schedule token. In some embodiments, this is determined based on values associated with schedule tokens selected in block 1220. If it is determined that there is an additional schedule token, then the process 1200 returns to block 1220 and proceeds as outlined above. If it is determined that there is not an additional unselected schedule token, then the process 1200 continues to block 1230, and proceeds to block 912 of FIG. 9.

Figure 13:
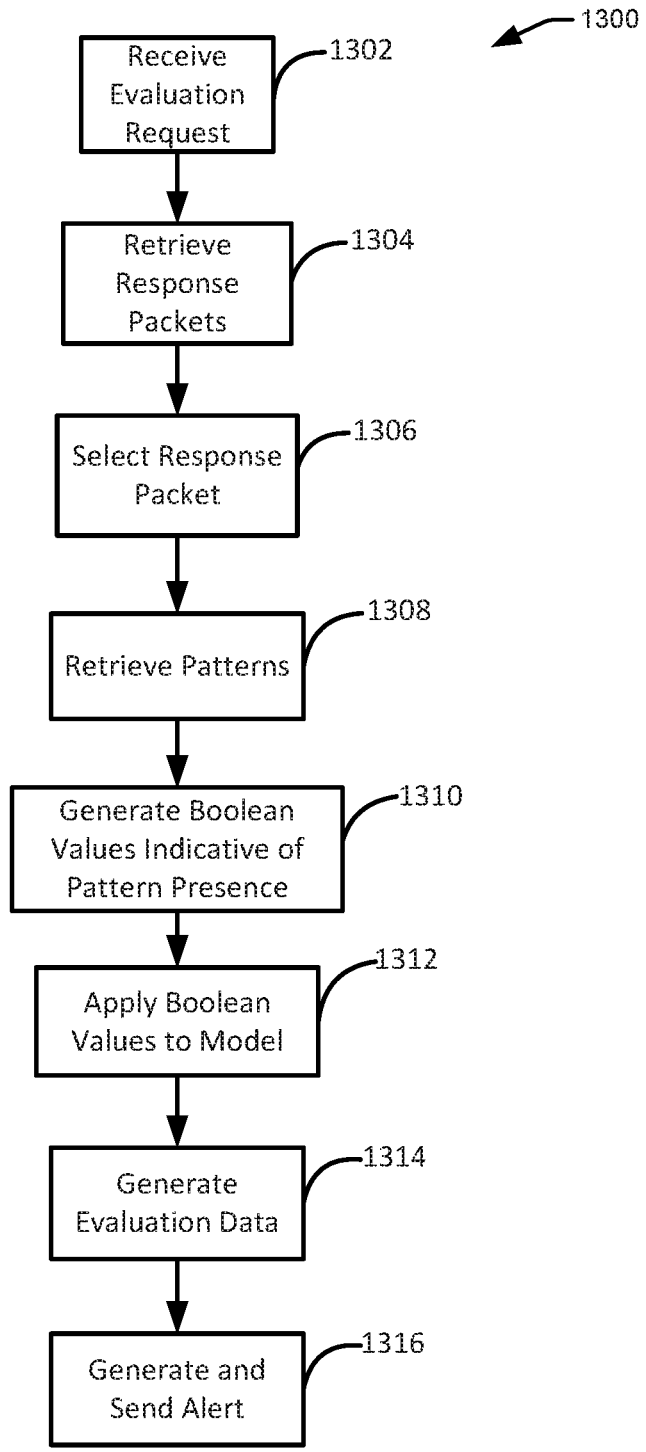
FIG. 13 is a flowchart illustrating one embodiment of a process for automatically alerting a user device based on a generated evaluation.

With reference now to FIG. 13, a flowchart illustrating one embodiment of a process 1300 for automatically alerting a user device based on a generated evaluation is shown. The process 1300 can be performed by the content distribution network 100, and specifically by some or all of the components of the content distribution network 100 shown in FIG. 8.

The process 1300 begins at block 1302, wherein an evaluation request is received. The evaluation request can comprise a request for the generation of an evaluation of one or several response packets. In some embodiments, the evaluation request can be received by the server 102 from one or several of the user devices 106 and/or the supervisor device 110 via the communication network 120. After the evaluation request has been received, the process 1300 proceeds to block 1304, wherein one or several response packets are received and/or retrieved. In some embodiments, these response packets can be received from one or several user devices 106 and/or from the model data source 309.

After the response packets have been retrieved and/or received, the process 1300 proceeds to block 1306, wherein a response packet is selected. In some embodiments, the response packet can be selected from the response packets received and/or retrieved in block 1304. In some embodiments, a value indicative of selection can be associated with a response packet after it has been selected.

After the response packet has been selected, the process 1300 proceeds to block 1308, wherein the patterns are retrieved. In some embodiments, the patterns can be retrieved by the feature generator 806 from the database server 104, and specifically from the pattern database 311. After the patterns have been retrieved, the process 1300 proceeds to block 1310, wherein one or several Boolean values indicative of the presence or absence of patterns in the selected response packet are generated. In some embodiments, for example, this data can include a first Boolean value identifying a pattern associated with the Boolean value as present in the response packet, and/or a second Boolean value identifying a pattern associated with the Boolean value as absent in the response packet. In some embodiments, the generation of the Boolean values can further include the storing of the Boolean values in the database server 104, and specifically in the pattern database 311.

After the Boolean values have been generated, the process 1300 proceeds to block 1312, wherein the Boolean values are applied to the model. In some embodiments, this can include the inputting of the Boolean values associated with a response packet into the model, which model can be retrieved from the model database 309 by the model engine 808. After the Boolean values have been applied to the model, the process 1300 proceeds to block 1314, wherein evaluation data is generated. In some embodiments, the evaluation data can be the output of the model after the inputting of the Boolean values of a response packet.

After the evaluation data has been generated, the process 1300 proceeds to block 1316, wherein an alert is generated and sent. In some embodiments, the alert can be automatically generated and sent after the evaluation data is generated, and in some embodiments, the alert can be generated and sent if the evaluation data indicates inadequate performance. In some embodiments, for example, the adequacy of a response packet can be determined by comparing the evaluation data to a threshold. If the comparison of the evaluation data to the threshold indicates an inadequate performance, then an alert is generated and sent. In some embodiments, the alert can be generated by the server and can be sent to one or more of the user device 106 and the supervisor device 110. In some embodiments, the alert can, when received by one of the devices 106, 110, automatically provide information to the user of that recipient device 106, 110 via, for example, the I/O subsystem, and in some embodiments, the alert can automatically provide information to the user of that recipient device 106, 110, in response to receipt of an input from the user of that recipient device 106, 110. In some embodiments, the recipient device 106, 110 can be a third-party device when the recipient device 106, 110 is not the source of the response packet. In some embodiments, this automatically provided information can include information relating to the response packet, the evaluation data, and/or any recommended remedial action.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instructions may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for alerting a third party device according to a result of automated evaluation of a received response packet according to at least one pattern in the received response packet, the system comprising:
  memory comprising:
    a pattern database containing data defining at least two data patterns of tokens;
    a model database comprising a model for generating an evaluative output for the received response packet;
  a user device comprising:
    a network interface configured to exchange data with a content management server via a communication network; and
    an I/O subsystem configured to convert electrical signals to user interpretable outputs user interface;
  the content management server, wherein the content management server is configured to:
    receive a response packet from the user device, wherein the response packet comprises a user generated text string forming a plurality of words;
    receive data from the pattern database, wherein the data from the pattern database defines at least two data patterns of tokens that correspond to one or more partitions of an evaluation schedule;
    automatically generate a binary value for each of the at least two data patterns of tokens, wherein the binary value automatically generated for each of the at least two data patterns of tokens comprises one of: a first binary value indicative of a presence of the data pattern in the response packet; and a second binary value indicative of an absence of the data pattern in the response packet;
    automatically generate an evaluation of the response packet based on the binary value generated for each of the at least two data patterns of tokens by applying the automatically generated binary values to the model; and
    generate and send an alert to a supervisor device when the evaluation is below a threshold value; and
  a supervisor device comprising:
    a network interface configured to exchange data with the content management server via the communication network; and
  an I/O subsystem configured to convert electrical signals to user interpretable outputs user interface;
  wherein the supervisor device is configured to receive the alert from the content management server and automatically provide alert data to the user via the I/O subsystem in response to receipt of the alert, wherein the alert data identifies at least one aspect of the response packet and the user of the user device.

2. The system of claim 1, wherein the content management server is further configured to train the model.

3. The system of claim 2, wherein the memory further comprises a training database, wherein the training database comprises a plurality of response packets associated with a data packet.

4. The system of claim 3, wherein the training database further comprises an evaluation matrix, wherein the evaluation matrix identifies a plurality of performance levels and indicia associated with the performance levels.

5. The system of claim 4, wherein the indicia identify one or more attributes of a response packet of one or more performance levels.

6. The system of claim 5, wherein the training the model comprises:
receiving a training set from the training database, wherein the training set comprises some or all of the plurality of response packets associated with the data packet;
retrieving score data for the response packets in the training set;
dividing the training set into a plurality of performance groups, wherein each of the performance groups comprises a subset of the training set, wherein the training set is divided into performance groups according to the retrieved score data; and
identifying patterns in each of the performance groups.

7. The system of claim 6, wherein the identifying patterns in each of the performance groups comprises:
selecting a response packet;
tokenizing the text string of the response packet, wherein the text string is tokenized such that a token is associated with a word; and
extracting pattern data from the tokenized text string.

8. The system of claim 7, wherein the pattern data is stored in the pattern database.

9. The system of claim 8, wherein the alert comprises code to direct the supervisor device to provide an indicator of the received alert via the I/O subsystem.

10. The system of claim 9, wherein the indicator of the received alert comprises at least one of: an aural indicator; a tactile indicator; or a visual indicator.

11. A method for alerting a third party device according to a result of automated evaluation of a received response packet according to at least one pattern in the received response packet, the method comprising:
receiving a response packet at a content management server from a user device via a communications network, wherein the response packet comprises a user generated text string forming a plurality of words;
receiving data from a pattern database, wherein the data from the pattern database defines at least two data patterns of tokens that correspond to one or more partitions of an evaluation schedule;
automatically generating a binary value for each of the at least two data patterns of tokens with the content management server, wherein the binary value automatically generated for each of the at least two data patterns of tokens comprises one of: a first binary value indicative of a presence of the data pattern in the response packet; and a second binary value indicative of an absence of the data pattern in the response packet;
automatically generating an evaluation of the response packet based on the binary value generated for each of the at least two data patterns of tokens by applying the automatically generated binary values to a model for generating an evaluative output for the received response packet; and
generating and sending an alert to a supervisor device when the evaluation triggers an alert status.

12. The method of claim 11, further comprising training the model.

13. The method of claim 12, wherein the training the model comprises:
receiving a training set from a training database, wherein the training set comprises some or all of a plurality of response packets associated with the response packet;
retrieving score data for the response packets in the training set;
dividing the training set into a plurality of performance groups, wherein each of the performance groups comprises a subset of the training set, wherein the training set is divided into performance groups according to the retrieved score data; and
identifying patterns in each of the performance groups.

14. The method of claim 13, wherein the identifying patterns in each of the performance groups comprises:
selecting a response packet;
tokenizing the text string of the response packet, wherein the text string is tokenized such that a token is associated with a word; and
extracting pattern data from the tokenized text string.

15. The method of claim 14, further comprising storing the pattern data in a pattern database.

16. The method of claim 15, wherein the alert comprises code to direct the supervisor device to provide an indicator of having received the alert via an I/O subsystem.

17. The method of claim 16, wherein the indicator of having received the alert comprises at least one of: an aural indicator; a tactile indicator; or a visual indicator.

18. One or more non-transitory, computer-readable media having computer-readable instructions thereon which, when executed by one or more processors, cause the one or more processors to performing actions including:
processing a response packet received from a user device via a communications network, wherein the response packet comprises a user generated text string forming a plurality of words;
receiving data from a pattern database, wherein the data from the pattern database defines at least two data patterns of tokens that correspond to one or more partitions of an evaluation schedule;
automatically generating a binary value for each of the at least two data patterns of tokens with a content management server, wherein the binary value automatically generated for each of the at least two data patterns of tokens comprises one of: a first binary value indicative of a presence of the data pattern in the response packet; and a second binary value indicative of an absence of the data pattern in the response packet;
automatically generating an evaluation of the response packet based on the binary value generated for each of the at least two data patterns of tokens by applying the automatically generated binary values to a model for generating an evaluative output for the received response packet; and
generating and sending an alert to a supervisor device when the evaluation triggers an alert status.

19. The one or more non-transitory, computer-readable media of claim 18, where the actions further comprise training the model.

20. The one or more non-transitory, computer-readable media of claim 19, wherein the training the model comprises:
   processing a training set from a training database, wherein the training set comprises some or all of a plurality of response packets associated with the response packet;
   retrieving score data for the response packets in the training set;
   dividing the training set into a plurality of performance groups, wherein each of the performance groups comprises a subset of the training set, wherein the training set is divided into performance groups according to the retrieved score data; and
   identifying patterns in each of the performance groups.

* * * * *